United States Patent Office 2,815,357
Patented Dec. 3, 1957

2,815,357

SYNTHESIS OF AROMATIC HYDROCARBONS

Herman S. Seelig, Valparaiso, and Herman I. Weck, Dyer, Ind., assignors to Standard Oil Company, Chicago, Ill., a corporation of Indiana No Drawing. Application March 12, 1954,
Serial No. 415,956

7 Claims. (Cl. 260—449)

This invention relates to a process for the synthesis of hydrocarbons, particularly aromatic hydrocarbons, from mixtures of carbon monoxide with hydrogen in the presence of catalysts.

In the well-known Fischer-Tropsch synthesis, iron-type or alkali-promoted thoria catalysts have been employed to produce paraffins and olefins, accompanied by very minor proportions, at most, of aromatic hydrocarbons and by variable yields of oxygenated organic compounds, depending upon the particular catalyst and synthesis conditions. The octane rating of conventional Fischer-Tropsch synthesis products is low, and it has heretofore been necessary to reform the synthesis products in order to increase the octane value thereof to a suitable range for use in internal combustion engines.

It is an object of this invention to provide a catalytic synthesis process which can be operated to produce substantial yields of liquid hydrocarbons boiling substantially within the gasoline boiling range and comprising predominantly or entirely relatively low boiling liquid aromatic hydrocarbons of high octane value. Another object of this invention is to provide suitable catalysts for the production of aromatic hydrocarbons in substantial yields from mixtures of carbon monoxide and hydrogen at low temperatures. An additional object is to provide both catalysts and processing conditions whose employment in the reduction of carbon monoxide results in substantial yields of relatively low boiling aromatic hydrocarbons.

Essentially, the process of the present invention comprises the contacting of catalysts hereinafter defined with mixtures of hydrogen and carbon monoxide having molar ratios between about 1/4 and 4/1 at temperatures between about 600 and about 850° F. and pressures of at least about 400 p. s. i. g. up to about 10,000 p. s. i. g. or even higher, e. g. 25,000 p. s. i. g., at space velocities (volume of gas per hour per volume of catalyst) of at least about 50 up to about 5000 (in fixed-bed reactors) or even much higher, for example up to about 20,000 (in fluidized-bed reactors). The preferred temperature range is about 650 to about 800° F. and the preferred pressure range is about 450 to about 5000 p. s. i. g. Preferred operating conditions can be determined in specific instances by small scale tests in which operating variables are systematically explored.

The catalysts employed in the practice of the present invention comprise essentially zinc oxide or zinc sulfide supported upon an activated alumina (a gamma alumina) containing less than about 0.3 w. percent (preferably less than 0.1 w. percent) of alkali metal (calculated as alkali metal oxide) and containing an acid-acting fluoride as a promoter. The proportion of acid-acting fluoride, calculated as HF, in the catalyst can be varied between about 0.1 and about 2.5 w. percent, but is preferably present within the catalyst in proportions between about 0.2 and about 1.0 w. percent. As will appear hereinafter, the proportion of zinc oxide or sulfide in the catalyst must be closely controlled in order to secure the best yields of aromatic hydrocarbons in the synthesis. The proportion of zinc oxide or sulfide in the finished catalyst can be varied between about 1 and about 20 w. percent, and is preferably between about 2 and about 10 w. percent. In lieu of the alumina support or in partial replacement thereof, we may employ other difficulty reducible metal oxides selected from the class of titania, zirconia and vanadia.

Although zinc oxide-alumina catalysts have heretofore been employed for the reduction of carbon monoxide to produce hydrocarbons, the yields of aromatic hydrocarbons have heretofore been nil or low for two reasons not appreciated by prior art investigators:

(1) Alumina, as ordinarily prepared by the precipitation of aluminum nitrate with sodium carbonate followed by repeated washings with water and drying, contains of the order of 1.5 w. percent of $Na_2O$. Although alkali metal oxides are desirable promoters for iron-type synthesis catalysts, even relatively small proportions of alkali metal oxides serve to prevent the formation of aromatic hydrocarbons when present in zinc oxide-alumina catalysts.

(2) Acid-acting fluorides are remarkable promoters for zinc oxide-alumina catalysts in that they induce a very large increase in the yield of aromatic hydrocarbons in the synthesis process while inducing only a relatively minor increase in the extent of carbon monoxide conversion.

As a consequence of the present invention, new sources of industrially attractive aromatic hydrocarbons become available.

The zinc oxide-alumina and zinc sulfide-alumina catalysts having an alkali metal oxide content below about 0.3 w. percent can be prepared by known methods or combinations of known methods. A particularly desirable method of making an activated alumina containing little or no alkali metal oxide involves the preparation of an alumina sol by the reaction of aluminum amalgam with a dilute aqueous solution of an organic acid such as formic acid or acetic acid, which sol is then treated with ammonium hydroxide to precipitate a super-pure alumina gel containing little or no alkali metal oxide; this is the so-called "Indiana alumina sol technique." References to the preparation of super-pure alumina sols are given in our copending application Serial No. 325,778, filed December 13, 1952, now U. S. Patent 2,727,055. In order to prepare a zinc oxide-alumina catalyst, zinc nitrate is added to the alumina sol before precipitation. The acid-acting fluoride may also be incorporated with the zinc nitrate and the alumina sol, in proportions desirable to effectively promote the synthesis action of the finished catalyst.

Thus a suitable catalyst may be prepared by mixing an aqueous solution containing the desired proportions of zinc nitrate or other water-soluble zinc salt, ammonium fluoride and Indiana alumina sol, precipitating oxides of zinc and aluminum containing fluoride by the addition of ammonium hydroxide solution, filtering the precipitate, thereafter slowly drying the precipitate in air at a suitable temperature (for example, about 185° F.) and finally calcining the catalyst in air, for example at a temperature of about 900° F. It will be understood that the alumina component of the catalyst may be partially or completely replaced by titania, zirconia or vanadia of suitably low alkali content. The ZnS—$Al_2O_3$-fluoride catalyst can be prepared by similar methods.

The acid-acting fluorides employed to promote the catalysts are HF or materials capable of forming hydrogen fluoride by thermal or hydrolytic decomposition at or below the temperatures employed in the synthesis operation, e. g. ammonium fluoride. Since the catalysts inevitably contain water as prepared (usually about 1 to 10 w. percent water), they may be treated with materials which are capable of reacting with water to produce hydrogen fluoride. Such materials include fluorine, $ClF_3$, $BrF_3$, $BF_3$, carbonyl fluoride, acyl fluorides and reactive alkyl fluorides, although the latter may be used as sources of HF via thermal decomposition. Examples of acyl fluorides include acetyl fluoride, propionyl fluoride, hexahydrobenzoyl fluoride, etc. Suitable alkyl fluorides include ethyl fluoride, isopropyl fluoride, sec-butyl fluoride, etc. In lieu of or in addition to ammonium fluoride, we may employ various hydrofluorides of volatile amines, such as methylammonium fluoride, trimethylammonium fluoride, triethylammonium fluoride, etc. The incorporation of acid-acting fluoride may be achieved through treatment of the refractory metal oxide catalyst support (alumina or the like) prior to the incorporation of the zinc oxide or zinc sulfide component; by treatment of the zinc oxide or zinc sulfide component of the catalyst; by treatment of the catalyst prior to or after drying or calcining; by the introduction of acid-acting fluoride into the reactor during synthesis, for example, by the inclusion of very small proportions of certain of the acid-acting fluorides intermittently in proportions sufficient to activate the catalyst and to affect its selectivity for the synthesis of aromatic hydrocarbons.

In order more specifically to describe and illustrate the invention, without the intent unduly to limit the same, illustrative examples are provided hereinafter. The zinc oxide-alumina catalysts employed in the examples were prepared by coprecipitation of zinc oxide and alumina (derived from an Indiana sol) by the addition of aqueous ammonia to a mixture of zinc nitrate and Indiana alumina sol and activated by the addition of a suitable proportion of HF or ammonium fluoride before the coprecipitation of the metal oxides. These catalysts were characterized by their low content of alkali metal oxide, viz. below about 0.1 w. percent. In all instances the synthesis gas contained 50 mol percent each of hydrogen and carbon monoxide. One hundred thirty ml. of catalyst was contained in a copper tube inserted within a vertical stainless steel reactor. The synthesis gas was passed downwardly through the fixed bed of catalyst, thence in sequence through three product separators operated, respectively, at 300° F., 80° F. and 32° F. A convenient and suitable space velocity was chosen in the examples, viz. about 500 volumes of gas per hour per volume of catalyst.

The following data afford a direct comparison of the effects of promoting a zinc oxide-alumina catalyst with an acid-acting fluoride, compared with an unpromoted catalyst. The test runs recorded in Tables 1 and 2 were performed at 450 p. s. i. g.

TABLE 1

10% ZnO on $Al_2O_3$[a]

| Temp., ° F. | Percent CO conv. | Product carbon distribution (Percent C) | | | | Yields (grams/normal cubic meter) | |
|---|---|---|---|---|---|---|---|
| | | $CO_2$ | $C_1$–$C_2$ | $C_3$+ (non-arom.) | Arom. | $C_3$+ (total) | Arom. only |
| 700 | 8.4 | 68 | 20 | 1 | 11 | 34 | 32 |
| 750 | 11.0 | 53 | 35 | 1 | 11 | 38 | 33 |
| 900 | 22.2 | 46 | 43 | 8 | 2 | 30 | 5 |
| 975 | 28.2 | 46 | 44 | 9 | 1 | 28 | 3 |

[a] 0.01% $Na_2O$ by emission spectrographic analysis.

TABLE 2

10% ZnO on $Al_2O_3$ Promoted with 1% $NH_4F$

| Temp., ° F. | Percent CO conv. | Product carbon distribution (Percent C) | | | | Yields (grams/normal cubic meter) | |
|---|---|---|---|---|---|---|---|
| | | $CO_2$ | $C_1$–$C_2$ | $C_3$+ (non-arom.) | Arom. | $C_3$+ (total) | Arom. only |
| 650 | 8.3 | 63 | 21 | 1 | 15 | 46 | 43 |
| 700 | 8.7 | 65 | 22 | 1 | 12 | 53 | 50 |
| 750 | 8.9 | 56 | 35 | 1 | 8 | 29 | 29 |
| 850 | 10.1 | 56 | 42 | <1 | <2 | 8 | 7 |

From a comparison of Tables 1 and 2, it will be noted that fluoride promotion substantially increased the yield of aromatic hydrocarbons and, in some instances, of $C_3$× hydrocarbons. The theoretical ultimate yield of aromatics is about 300 g./n. c. m. of the 1/1 feed gas.

The liquid products obtained from the operations set forth in Table 2 were combined and subjected to a Micro dye analysis with the following results:

|  | Volume percent |
|---|---|
| Paraffins and naphthenes | 4.5 |
| Olefins | 2.5 |
| Aromatics | 93.0 |
|  | 100.0 |

The liquid products were then fractionally distilled and subjected to infrared absorption analysis with the following results:

TABLE 3

| Boiling range, ° C. | Refractive index range | Vol. percent | Constituent |
|---|---|---|---|
| 112–135 | 1.410–1.450 | 3.6 | Paraffins and olefins of the type $R\diagdown C=CH_2$ and $R\diagdown C=CH_2$ (R is alkyl) and 10% toluene. |
| 135–150 | 1.450–1.476 | 3.4 | Meta- and paraxylene. |
| 150–193 | 1.465–1.502 | 15.4 | 1,2,3- and 1,2,4-trimethylbenzene; 1-methyl-2-ethyl-, 1-methyl-3-ethyl-, and 1-methyl-4-ethylbenzene. |
| 193–203 | 1.502–1.508 | 5.7 | 1,3-dimethyl-3-ethylbenzene; 1,3- and 1,4-dimethyl-2-ethylbenzene. |
| 203–205 | 1.508–1.510 | 3.6 | Durene and isodurene. |
| 205–232 | 1.508–1.510 | 15.5 | 1,2,3,4-tetramethylbenzene and other unidentified aromatics. |
| 232–234 | Solid | 3.4 | Pentamethylbenzene. |
| 234–258 | 1.519 | 15.8 | 2-methylnaphthalene and other unidentified aromatics. |
| 258–282 | Solid | 8.0 | Hexamethylbenzene. |
| 282–302 | 1.529–1.591 | 15.2 | Unidentified aromatics. |
| 302–328 | Solid | 1.7 | Possibly 1-phenylnaphthalene. |
| 328+ | Solid | 8.7 | Residue. |
|  |  | 100.0 |  |

Further examples of our invention are illustrated in the following tabulation of data:

lyst was prepared by adding ammonium sulfide to an aqueous solution of zinc nitrate (distilled water), mixing the

TABLE 4

*Fluoride-promoted ZnO on Al$_2$O$_3$ catalysts*

[1/1 H$_2$/CO synthesis gas used in all runs at a space velocity of 500 v./v./hr.]

| Run No | P-40 | L-43 | K-47 | K-48 | L-46 | P-41 | L-44 | X-5 |
|---|---|---|---|---|---|---|---|---|
| Percent ZnO | 3 | 10 | 10 | 20 | 10 | 10 | 10 | 10 |
| Percent NH$_4$F | 1 | 0.5 | 4 | 1 | | | | 0.5 |
| Percent HF | | | | | 0.5 | | | |
| Percent KF | | | | | | 0.8 | | |
| Percent K$_2$CO$_3$ | | | | | | | 0.5 | |
| Percent Na$_2$O* | 0.08 | 0.02 | 0.03 | 0.02 | 0.08 | 0.05 | 0.02 | 0.02 |

| Aromatic yields, g/n. cu. m. H$_2$+CO consumed | | | | | | | | |
|---|---|---|---|---|---|---|---|---|
| Temp., °F.: | | | | | | | | |
| 600 | | | | | 0.0 | | | |
| 650 | 20 | | 0.0 | 0.0 | | 0.0 | | 8 |
| 700 | | 38 | 40 | 7 | 27 | 7 | 0.0 | 89 |
| 750 | | 47 | | | | | 2 | 137 |
| 800 | 59 | 28 | 30 | 27 | 34 | 26 | 10 | 42 |
| 850 | 43 | 18 | | | | | 13 | 26 |
| 900 | | 7 | | | | | 18 | 6 |
| 975 | | 0.5 | | | | | 0.7 | 0.9 |

| Pressure, p. s. i. g | 450 | | | | | | | 900 |
|---|---|---|---|---|---|---|---|---|

| Percent CO conversion | | | | | | | | |
|---|---|---|---|---|---|---|---|---|
| Temp., °F. | | | | | | | | |
| 600 | | | | | 0.5 | | | |
| 650 | 4 | | 0.0 | 12 | | 3 | | 3 |
| 700 | | 8 | 5 | 16 | 12 | 7 | | 12 |
| 750 | 7 | 12 | | | | | 10 | 11 |
| 800 | 6 | 13 | 19 | 24 | 23 | 16 | 13 | 10 |
| 850 | | 16 | | | | | 14 | 12 |
| 900 | | 14 | | | | | 18 | 14 |
| 975 | | 21 | | | | | 22 | 22 |
|  |  |  |  |  |  |  | 25 |  |
| R. I. of product oil ($n_D^{20}$) at 800° F | 1.5218 | 1.5297 | 1.5129 | 1.5122 | 1.5205 | 1.5143 | 1.5327 | 1.5149 |

*By emission spectrographic analysis.

The above table illustrates the results obtainable by variation in the proportion of zinc oxide in the catalyst. A comparison of runs P-40 and L-43 with K-48 shows that catalysts containing 3 to 10 weight percent ZnO gave good results and are somewhat preferable to the 20% ZnO catalyst of run K-48. These runs also illustrate results obtainable by variation of the proportion of ammonium fluoride in the catalyst from 0.5 to 4%. In run L-46, HF is shown to be the substantial equivalent of ammonium fluoride as a promoter in the synthesis. In run P-41 the use of KF as a promoter is illustrated. Run L-44 illustrates the use of a high alkali content ZnO—Al$_2$O$_3$ catalyst which is not promoted with a fluoride. A comparison of this run with the run of Table 1, wherein a low-alkali unpromoted ZnO—Al$_2$O$_3$ catalyst was used, shows the marked inhibiting effect of alkali on the yields of aromatic hydrocarbons which are obtainable in the synthesis at temperatures between about 700° F. and about 800° F. and also shows that the maximum yield of aromatic hydrocarbons with the low-alkali unpromoted catalyst is very much higher than with the high-alkali unpromoted catalyst. Furthermore, a comparison of the data of Table 1 and run L-44 with the other runs, in which fluoride-promoted low-alkali catalysts were used, shows, in general, that much higher ultimate yields of aromatic hydrocarbons are obtainable with the latter catalysts.

Run X-5, which was carried out at 900 p. s. i. g., shows a clear and marked advantage from the standpoint of aromatic hydrocarbon yields over the other runs in Table 4, which were effected at 450 p. s. i. g.

The following data were obtained by the employment of a fluoride promoted ZnS—Al$_2$O$_3$ catalyst. The catalyst was prepared by adding ammonium sulfide to an aqueous solution of zinc nitrate (distilled water), mixing the resulting suspension with a suitable proportion of Indiana alumina sol, followed by the precipitation of a gel by the addition of an aqueous ammonia solution in the proportion required to adjust the pH of the mixture to 8. The resulting gel was dried in air at approximately 185° F. and then was dried and treated with air at 900° F. for 4 hours.

TABLE 5

*Experimental results from run X-3*

[Catalyst: 4.9% ZnS+0.5% NH$_4$F on Al$_2$O$_3$. Run conditions: 830 p. s. i. g.; 500 v./v./hr.; 1/1 H$_2$/CO synthesis gas.]

| Run period | A | B | C | D | E | F |
|---|---|---|---|---|---|---|
| Hours | 72 | 72 | 72 | 72 | 72 | 48 |
| Temp. (° F.) | 700 | 750 | 800 | 850 | 900 | 975 |
| Percent contraction [1] | 11.1 | 10.6 | 15.6 | 16.6 | 17.5 | 19.9 |
| Percent CO conversion [2] | 20.9 | 27.2 | 31.3 | 31.7 | 31.3 | 34.3 |
| Product yields [1] (grams/n. cu. m. H$_2$+CO consumed): | | | | | | |
| C$_3$+ | 38.7 | 55.0 | 51.6 | 48.2 | 27.6 | 7.3 |
| Aromatics | 31.7 | 45.1 | 42.3 | 39.5 | 22.6 | 6.0 |
| R. I. of oil fraction | 1.5000 | 1.4999 | 1.4893 | 1.4840 | 1.4891 | 1.5127 |
| R. I. of water fraction | 1.3365 | 1.3360 | 1.3350 | 1.3341 | 1.3333 | 1.3331 |

[1] Based on a 100% weight balance on an output basis.
[2] Based on 100% carbon balance on an output basis.

The proper selection and activation of catalysts for the purposes of aromatics production from carbon monoxide and hydrogen is at present a purely empirical procedure, since no method of predicting the suitability of catalysts or promoters for the stated purpose is now known. Seemingly similar catalysts from the standpoint of chemical constitution, show widely different capacities for producing aromatic hydrocarbons in the synthesis reaction, as will be evident from the data of Table 6 below:

TABLE 6

*Examples of other catalysts tested for the synthesis of aromatics*

| Catalyst | Percent CO conversion | Aromatic yield, g./n. cu. m. |
|---|---|---|
| ZnO | 25 | 3 |
| $ThO_2 + 0.1\%$ $K_2CO_3$ ($K_2CO_3$ precipitated) | 21 | 11 |
| 9% $TiO_2$ on $Al_2O_3$ | 7 | 11 |
| 8% $ZrO_2$ on $Al_2O_3$ | 13 | 7 |
| $ThO_2 + 5.0\%$ $K_2CO_3$ ($K_2CO_3$ precipitated) | 26 | 5 |
| 10% $WO_3$ on $Al_2O_3$ | 17 | 2 |
| 10% $Co_2O_3$ on $Al_2O_3$ | 15 | 1 |
| 10% $ThO_2 + 1\%$ $K_2CO_3$ on $Al_2O_3$ | 10 | Trace |
| 5% $MoS_3$ on $Al_2O_3$ | 63 | None |
| 8% $MoO_3$ on $Al_2O_3$ | 50 | None |
| 0.6% Pt on $Al_2O_3$ | 48 | None |
| $V_2O_5$ | 48 | None |
| 1.0% $ZrS_2$ on $ZrO_2$ | 40 | None |
| 10% $WO_3$ on $ZrO_2$ | 40 | None |
| 10% $MoO_3 + 1.0\%$ $NH_4F$ on $Al_2O_3$ | 22 | None |
| 9% $Ag_2O$ on $Al_2O_3$ | 16 | None |
| 10% $Ni_2O_3 + 0.5\%$ $NH_4F$ on $Al_2O_3$ | 11 | None |
| 9% $SnO_2 + 0.5\%$ $NH_4F$ on $Al_2O_3$ | 14 | None |
| 8% $MnO_3$ on $Al_2O_3$ | 9 | None |
| 9% $SnO_2$ on $Al_2O_3$ | 9 | None |
| 9% $B_2O_3$ on $Al_2O_3$ | 2 | None |
| 90% $SiO_2$—10% $Al_2O_3$ | 0 | None |

The above results represent the best yields which could be obtained in operations at 500 space velocity, equimolar proportions of hydrogen and carbon monoxide in the feed, a fixed bed of catalyst, and temperatures within the range of 700° F. to 975° F. The low aromatics productivity of ZnO alone will be apparent from the above table. It will be noted that ZnO alone showed scarcely any capacity for aromatics synthesis.

It will be understood that the conventional means of synthesis catalyst regeneration can be employed to reactivate partially spent fluoride-promoted zinc oxide-alumina catalyst.

The partially spent synthesis catalyst may be regenerated by burning carbonaceous deposits contained therein with a gas stream of low oxygen content at a maximum temperature not exceeding about 1000 to 1200° F. and fortification of the catalyst with fluoride promoter. Zinc sulfide catalysts may be sulfided by treatment with hydrogen sulfide or otherwise before being re-used in synthesis.

Conventional synthesis reactors of either the fixed-bed or fluidized-bed type may be employed in practicing the process of the present invention. It will be understood that unconverted gases may be recycled to the reactor or passed to a secondary reactor containing the promoted catalyst.

The aromatic hydrocarbon products of the present invention are practically uncontaminated with paraffins or olefins. The gasoline boiling range fractions may be employed alone or as blending components in motor gasoline or aviation fuels. The aromatic product mixtures produced by the process of this invention can be subjected to known separation procedures to produce concentrates of individual aromatic hydrocarbons or mixtures of isomers, which may be of value for the purpose of producing chemical derivatives.

Having thus described our invention, we claim:

1. A process for the preparation of hydrocarbons, including a substantial proportion of aromatic hydrocarbons, which process comprises contacting a mixture of hydrogen and carbon monoxide in a volume ratio between about 1:4 to 4:1 with a catalyst comprising essentially about 1 to about 20 weight percent of a compound of zinc selected from the class consisting of zinc oxide and zinc sulfide supported upon a difficultly reducible metal oxide selected from the class consisting of activated alumina, titania, zirconia and vanadia, between about 0.1 and about 2.5 weight percent of an acid-acting fluoride, calculated as HF, and not more than about 0.16 weight percent of alkali metal, calculated as oxide, effecting said contacting at a temperature between about 600° F. and about 850° F. at a pressure of at least about 400 p. s. i. g., and separating synthesis products including a substantial proportion of aromatic hydrocarbons.

2. The process of claim 1 wherein said difficultly reducible metal oxide is an activated alumina.

3. The process of claim 1 wherein said compound of zinc is zinc oxide.

4. The process of claim 1 wherein said compound of zinc is zinc sulfide.

5. The process of claim 1 wherein the catalyst consists essentially between about 2 and about 10 weight percent zinc oxide supported upon activated alumina, said catalyst contains between about 0.2 and about 1.0 weight percent of an acid-acting fluoride, calculated as HF, said catalyst contains not more than about 0.1 weight percent of an alkali metal, calculated as oxide, and said contacting is effected at a temperature between about 650° F. and about 800° F. at a pressure of at least about 400 p. s. i. g.

6. The process of claim 5 wherein said acid-acting fluoride is hydrogen fluoride.

7. The process of claim 5 wherein said acid-acting fluoride is ammonium fluoride.

References Cited in the file of this patent

UNITED STATES PATENTS

| | | |
|---|---|---|
| 2,194,186 | Pier et al. | Mar. 19, 1940 |
| 2,500,146 | Fleck et al. | Mar. 14, 1950 |
| 2,727,055 | Seelig et al. | Dec. 13, 1955 |